United States Patent
Bennett, Jr.

(10) Patent No.: US 6,179,354 B1
(45) Date of Patent: Jan. 30, 2001

(54) VEHICLE BODY SIDE PROTECTOR

(76) Inventor: John E. Bennett, Jr., 386 Whipple St., Brentwood, NY (US) 11717

( * ) Notice: Under 35 U.S.C. 154(b), the term of this patent shall be extended for 0 days.

(21) Appl. No.: 09/292,576

(22) Filed: Apr. 15, 1999

(51) Int. Cl.[7] .................................................. B60R 19/42
(52) U.S. Cl. ...................................... 293/128; 293/DIG. 6
(58) Field of Search ..................................... 293/128, 127, 293/DIG. 6

(56) References Cited

U.S. PATENT DOCUMENTS

| | | | |
|---|---|---|---|
| 4,708,380 | * | 11/1987 | Cruz ....................................... 293/128 |
| 4,726,614 | * | 2/1988 | Myers et al. .......................... 293/128 |
| 5,072,979 | * | 12/1991 | Swinton ................................. 293/128 |
| 5,162,139 | * | 11/1992 | Gomez et al. ........................... 428/31 |
| 5,184,857 | * | 2/1993 | Hawkins ................................ 293/128 |
| 5,333,923 | * | 8/1994 | Whitfield ............................... 293/128 |
| 5,879,037 | * | 3/1999 | Batiste .................................. 293/118 |

* cited by examiner

Primary Examiner—D. Glenn Dayoan
Assistant Examiner—Patricia Engle

(57) ABSTRACT

A vehicle body side protector for protecting the side of a vehicle bodies from damage. The vehicle body side protector includes a row of panels having a pair of opposite end panels and at least one middle panel interposed between the end panels. Each of the panels is pivotally coupled to the adjacent panels in the row of panels. The row of panels is detachably mounted to a side of a vehicle to protect the side of the vehicle from dent and ding damage.

13 Claims, 3 Drawing Sheets

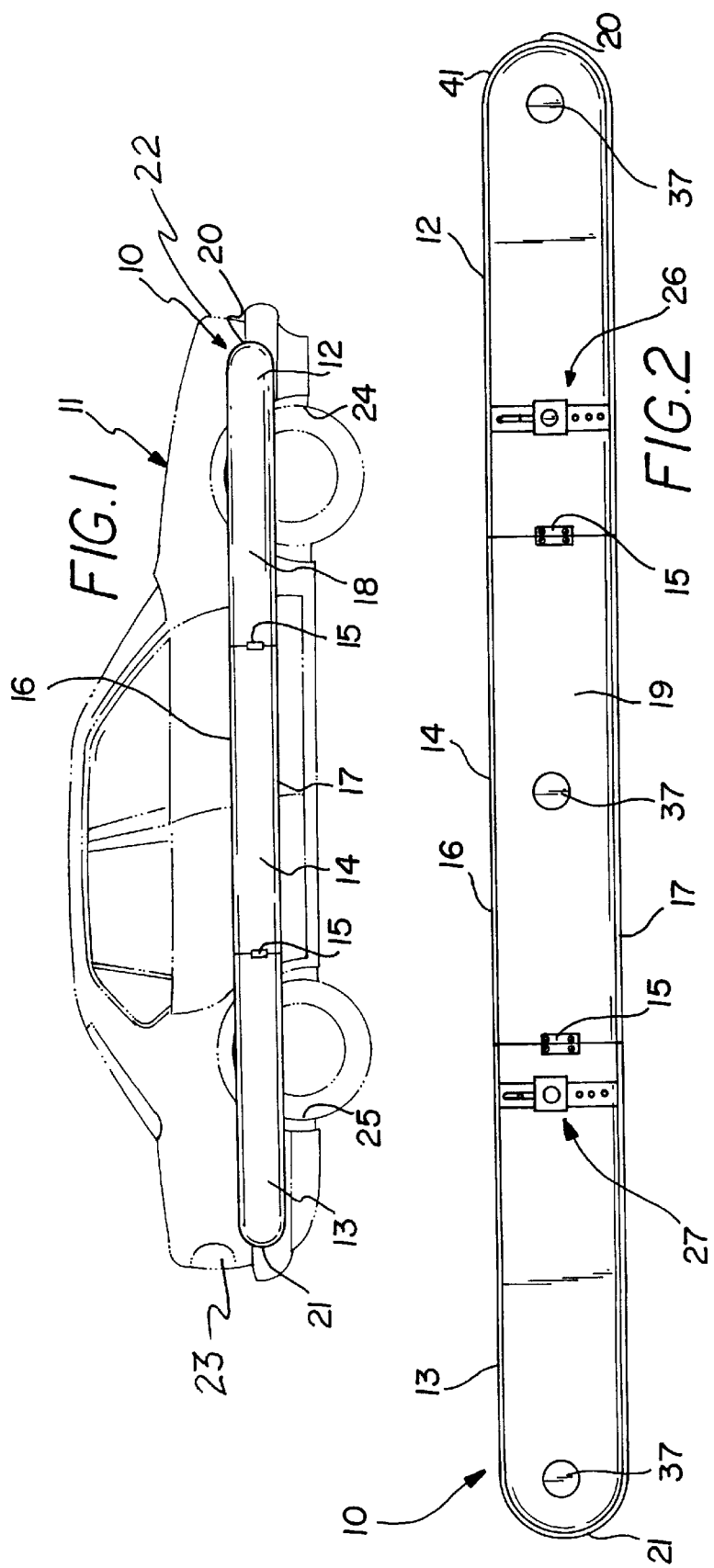

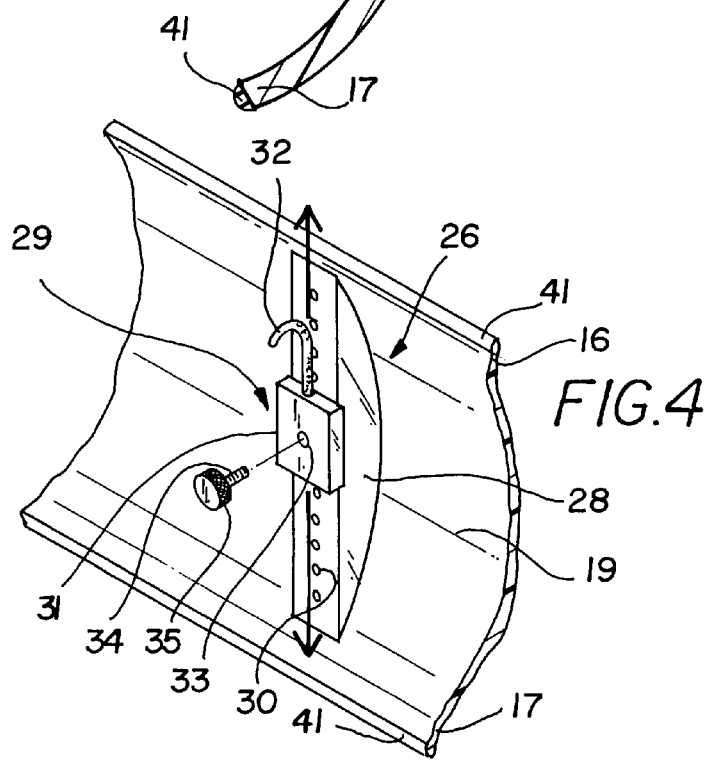

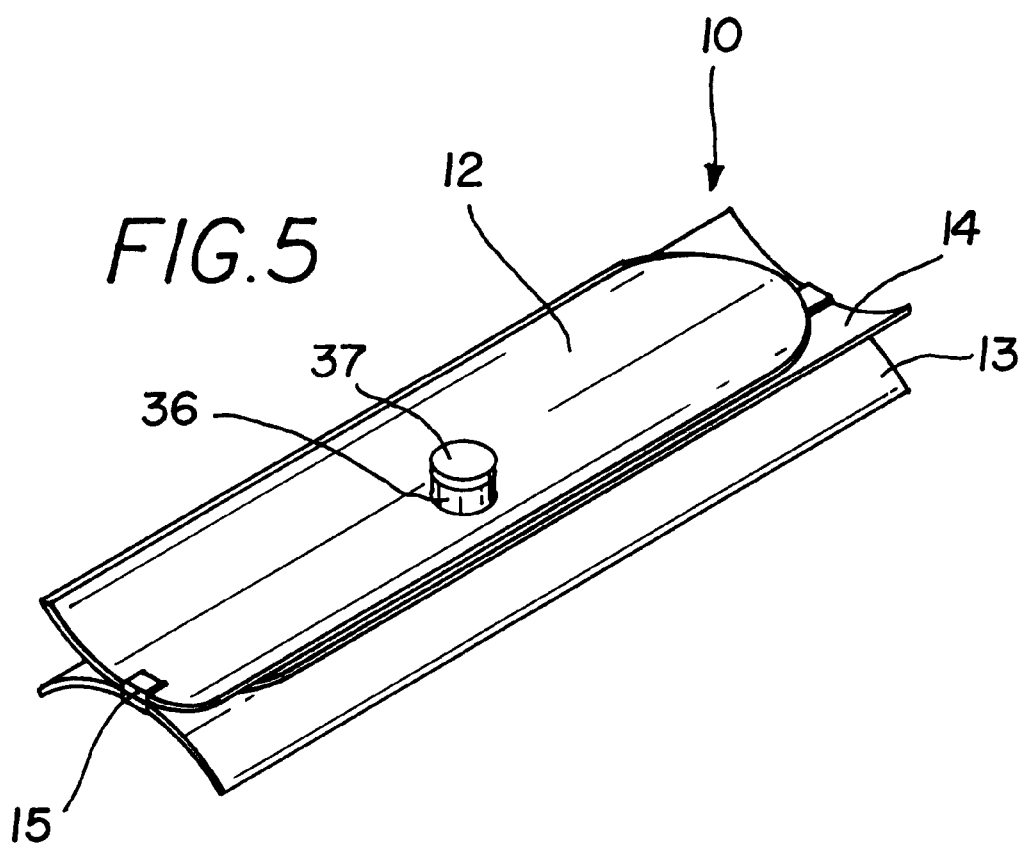

VEHICLE BODY SIDE PROTECTOR

BACKGROUND OF THE INVENTION

1. Field of the Invention

The present invention relates to devices for protecting the sides of vehicle bodies from damage and more particularly pertains to a new vehicle body side protector for protecting the side of a vehicle bodies from damage.

2. Description of the Prior Art

The use of devices for protecting the sides of vehicle bodies from damage is known in the prior art. More specifically, devices for protecting the sides of vehicle bodies from damage heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,188,407; U.S. Pat. No. 5,312,145; U.S. Pat. No. 3,367,702; U.S. Pat. No. 4,014,583; U.S. Pat. No. 4,690,446; and U.S. Pat. No. 4,398,758.

While these devices fulfill their respective, particular objectives and requirements, the aforementioned patents do not disclose a new vehicle body side protector. The inventive device includes a row of panels having a pair of opposite end panels and at least one middle panel interposed between the end panels. Each of the panels is pivotally coupled to the adjacent panels in the row of panels. The row of panels is detachably mounted to a side of a vehicle to protect the side of the vehicle from dent and ding damage.

In these respects, the vehicle body side protector according to the present invention substantially departs from the conventional concepts and designs of the prior art, and in so doing provides an apparatus primarily developed for the purpose of protecting the side of a vehicle bodies from damage.

SUMMARY OF THE INVENTION

In view of the foregoing disadvantages inherent in the known types of devices for protecting the sides of vehicle bodies from damage now present in the prior art, the present invention provides a new vehicle body side protector construction wherein the same can be utilized for protecting the side of a vehicle bodies from damage.

The general purpose of the present invention, which will be described subsequently in greater detail, is to provide a new vehicle body side protector apparatus and method which has many of the advantages of the devices for protecting the sides of vehicle bodies from damage mentioned heretofore and many novel features that result in a new vehicle body side protector which is not anticipated, rendered obvious, suggested, or even implied by any of the prior art devices for protecting the sides of vehicle bodies from damage, either alone or in any combination thereof.

To attain this, the present invention generally comprises a row of panels having a pair of opposite end panels and at least one middle panel interposed between the end panels. Each of the panels is pivotally coupled to the adjacent panels in the row of panels. The row of panels is detachably mounted to a side of a vehicle to protect the side of the vehicle from dent and ding damage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle body side protector apparatus and method which has many of the advantages of the devices for protecting the sides of vehicle bodies from damage mentioned heretofore and many novel features that result in a new vehicle body side protector which is not anticipated, rendered obvious, suggested, or even implied by any of the prior art devices for protecting the sides of vehicle bodies from damage, either alone or in any combination thereof.

It is another object of the present invention to provide a new vehicle body side protector which may be easily and efficiently manufactured and marketed.

It is a further object of the present invention to provide a new vehicle body side protector which is of a durable and reliable construction.

An even further object of the present invention is to provide a new vehicle body side protector which is susceptible of a low cost of manufacture with regard to both materials and labor, and which accordingly is then susceptible of low prices of sale to the consuming public, thereby making such vehicle body side protector economically available to the buying public.

Still yet another object of the present invention is to provide a new vehicle body side protector which provides in the apparatuses and methods of the prior art some of the advantages thereof, while simultaneously overcoming some of the disadvantages normally associated therewith.

Still another object of the present invention is to provide a new vehicle body side protector for protecting the side of a vehicle bodies from damage.

Yet another object of the present invention is to provide a new vehicle body side protector which includes a row of panels having a pair of opposite end panels and at least one middle panel interposed between the end panels. Each of the panels is pivotally coupled to the adjacent panels in the row of panels. The row of panels is detachably mounted to a side of a vehicle to protect the side of the vehicle from dent and ding damage.

Still yet another object of the present invention is to provide a new vehicle body side protector that protects the side of a vehicle from door dings and dents, especially when parked in a crowded parking lot with narrow parking stalls.

Even still another object of the present invention is to provide a new vehicle body side protector that is easy to mount and dismount from the side of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new vehicle body side protector in use an a side of a vehicle according to the present invention.

FIG. 2 is a schematic side view of the inner faces of the panels of the present invention.

FIG. 3 is a schematic cross sectional view of a panel of the present invention.

FIG. 4 is a schematic partial perspective view of the inner face of a panel illustrating a hinge assembly.

FIG. 5 is a schematic perspective view of the present invention in its folded position.

DESCRIPTION OF THE PREFERRED EMBODIMENT

With reference now to the drawings, and in particular to FIGS. 1 through 5 thereof, a new vehicle body side protector embodying the principles and concepts of the present invention and generally designated by the reference numeral 10 will be described.

As best illustrated in FIGS. 1 through 5, the vehicle body side protector 10 generally comprises a row of panels having a pair of opposite end panels and at least one middle panel interposed between the end panels. Each of the panels is pivotally coupled to the adjacent panels in the row of panels. The row of panels is detachably mounted to a side of a vehicle to protect the side of the vehicle from dent and ding damage.

In use, the vehicle body side protector 10 is designed for mounting to a side of a vehicle 11 when parked to protect the side of the vehicle body from damage such as door dings and dents. Specifically, the vehicle body side protector comprises a row of interconnected panels comprising a pair of opposite end panels 12,13 and at least one middle panel 14 interposed between the end panels. Each of the panels is pivotally coupled by a flexible hinge 15 to the ends of the adjacent panels in the row of panels. This arrangement permits pivoting of the panels into a folded position as illustrated in FIG. 5 where the panels are folded on top of one another for convenient storage in a vehicle and a deployed position as illustrated in FIGS. 1 and 2 where the row is fully extended along a common axis for covering most of the side of a vehicle.

The panels each comprises a resilient material such as a resilient plastic or vinyl to help absorb the force of blows to the panels such as by a door of an adjacent vehicle swinging into the panel. The panels each have a pair of generally straight and parallel sides 16,17 with a first of the pair of sides of each panel is extended generally collinear with one another and a second of the pair of sides of each panel is extended generally collinear with one another. Preferably, the panels each has an arcuate transverse cross section taken substantially perpendicular to the sides of the panels such that each panel has a convex outer face 18 and a concave inner face 19. Even more preferably, each of the end panels has a generally semi-circular rounded free end 20,21 to help eliminate any sharp edges on the ends of the row of panel that could accidentally scratch the exterior of a vehicle the protector is mounted to.

The row of panels is detachably mounted to a lower portion of a side of a vehicle such that the row of panels extends along over about three-fourth of the length of the side of the vehicle defined between front and back ends 22,23 of the vehicle. The row of panels is extended over front and back wheel wells 24,25 of the side of the vehicle such that the row of panels extends over a portion of the wheels in the wheel wells.

The end panels each have an adjustable hinge assembly 26,27 coupled to the inner face of the respective end panel for mounting the row of panels to a side of a vehicle. As best illustrated in FIG. 4, each hinge assembly comprises an elongate mounting rail 28 coupled to the inner face of the associated end panel and a hook bracket 29 detachably attached to the mounting rail. The mounting rail preferably has a longitudinal axis extending between the sides of the associated end panel generally perpendicular to the sides of the associated end panel. The mounting rail has a plurality of spaced apart threaded mounting holes 30 arranged in a row extending along the longitudinal axis of the mounting rail.

The hook bracket has a generally rectangular bracket portion 31 and a hook portion 32 extending from the bracket portion. The bracket portion has an bore 33 extending therethrough. The bracket portion is positioned adjacent the mounting rail such that the bore and one of the mounting holes of the mounting rail are generally coaxially aligned with one another and the hook portion upwardly and outwardly extends from the bracket portion. A threaded fastener 34 is extended through the bore of the mounting bracket and threadably inserted into the one mounting hole of the mounting rail to detachably attach the mounting bracket to the mounting rail. Preferably, the threaded fastener has a turning head 35 which has a frictionally enhanced surface with respect to a smooth surface for aiding the turning of the threaded fastener with a user's fingers.

In use, the hook portion of each hinge assembly is extended into an associated space between a door of the vehicle and an adjacent portion of the body of the vehicle. The hook portion of each hinge assembly is then hung on a door hinge located in the associated space of the vehicle which pivotally couples the door to the vehicle such that the row of panels are mounted to the side of the vehicle with the inner faces of the panels facing inwards towards the vehicle and the outer faces of the panels facing outwards from the vehicle.

The hinge assemblies are designed for permitting a user to adjust the position of the hook portion to permitting proper positioning of the row of panels for a wide variety of vehicles regardless to what height the door hinges are located on the vehicle.

Each of the panels also preferably has a generally cylindrical extent 36 outwardly extending from the inner face of the respective panel. Each of the extents has a terminal end opposite the inner face of the associated panel. Each of the extents has a magnet 37 mounted to the terminal end of the respective extent, each magnet has an outer face generally lying in a common plane with the sides of the associated panel. In use, the magnets are magnetically coupled to the side of the vehicle to magnetically mount the row of panels to the vehicle. Preferably, as best illustrated in FIG. 3, each of the extents has a socket 38 in the terminal end of the respective extent and an inwardly radiating resiliently annular lip 39 around the periphery of the socket. Each magnet is inserted into the socket of the associated extent. Each magnet has an annular groove therein into which the lip of the socket is inserted into the annular groove of the magnet to secure the magnet in the socket.

Preferably, each of the magnets has a coating 40 thereon designed for reducing frictional contact between the magnet and the vehicle and so that the magnets do not scratch the side of the vehicle. Ideally, the coating comprises a polytetrafluoroethylene (commonly known under the tradename TEFLON) coating.

The sides of the panels abut the vehicle when the panels are mounted to the vehicle, the sides of the panels and the rounded free ends of the end panels define an outer perimeter. Ideally, a resiliently deformable foamed edging 41 is coupled along the outer perimeter such that the edging abuts the vehicle when the row of panels are mounted to the vehicle to help prevent scratch of the vehicle with the sides and rounded free ends of the panels.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle body side protector, comprising:
   a row of panels comprising a pair of opposite end panels and at least one middle panel interposed between said end panels;
   each of said panels being pivotally coupled to the adjacent panels in said row of panels;
   said panels each having an outer face and an inner face;
   said row of panels being detachably mounted to a side of a vehicle;
   wherein said end panels each have a hinge assembly coupled to said inner face of the respective end panel for mounting said row of panels to a side of a vehicle; and
   wherein each hinge assembly comprises an elongate mounting rail coupled to said inner face of the associated end panel and a hook bracket detachably attached to said mounting rail,
   wherein said mounting rail has a plurality of spaced apart mounting holes,
   wherein said hook bracket has a bracket portion and a hook portion extending from said bracket portion,
   wherein said bracket portion has a bore extending therethrough,
   wherein a fastener is extended through said bore of said mounting bracket and into one of said mounting hole of said mounting rail to attach said mounting bracket to said mounting rail.

2. The vehicle body side protector of claim 1, wherein said hook portions of each hinge assembly is extended into an associated space between a door of the vehicle and an adjacent portion of the body of the vehicle, said hook portion of each hinge assembly being hung on a door hinge located in the associated space of the vehicle such that said row of panels are mounted to the side of the vehicle with said inner faces of said panels facing inwards towards the vehicle and the outer faces of said panels facing outwards from the vehicle.

3. The vehicle body side protector of claim 1, wherein each of said panels has an extent outwardly extending from said inner face of the respective panel, each of said extents having a terminal end opposite said inner face of the associated panel, and wherein each of said extents having a magnet mounted to said terminal end of the respective extents.

4. The vehicle body side protector of claim 3, wherein each of said magnets has a polytetrafluoroethylene coating thereon.

5. The vehicle body side protector of claim 1, wherein said panels each have an arcuate transverse cross section taken substantially perpendicular to said sides of said panels such that each panel has a convex outer face and a concave inner face.

6. The vehicle body side protector of claim 5, wherein each of said end panels has a generally semi-circular rounded free end.

7. A vehicle body side protector, comprising:
   a row of panels comprising a pair of opposite end panels and at least one middle panel interposed between said end panels;
   each of said panels being pivotally coupled to the adjacent panels in said row of panels;
   said panels each having an outer face and an inner face;
   said row of panels being detachably mounted to a side of a vehicle;
   wherein said end panels each have a hinge assembly coupled to said inner face of the respective end panel for mounting said row of panels to a side of a vehicle;
   wherein each hinge assembly comprises an elongate mounting rail coupled to said inner face of the associated end panel and a hook bracket detachably attached to said mounting rail; and
   wherein said hook bracket has a bracket portion and a hook portion extending from said bracket portion.

8. The vehicle body side protector of claim 7, wherein said hook portions of each hinge assembly is extended into an associated space between a door of the vehicle and an adjacent portion of the body of the vehicle, said hook portion of each hinge assembly being hung on a door hinge located in the associated space of the vehicle such that said row of panels are mounted to the side of the vehicle with said inner faces of said panels facing inwards towards the vehicle and the outer faces of said panels facing outwards from the vehicle.

9. The vehicle body side protector of claim 7, wherein each of said panels has an extent outwardly extending from said inner face of the respective panel, each of said extents having a terminal end opposite said inner face of the associated panel, and wherein each of said extents having a magnet mounted to said terminal end of the respective extent.

10. The vehicle body side protector of claim 9, wherein each of said magnets has a polytetrafluoroethylene coating thereon.

11. The vehicle body side protector of claim 7, wherein said panels each have an arcuate transverse cross section taken substantially perpendicular to said sides of said panels such that each panel has a convex outer face and a concave inner face.

12. The vehicle body side protector of claim 7, wherein each of said end panels has a generally semi-circular rounded free end.

13. A vehicle body side protector for mounting to a side of a vehicle when parked to protect the side of the vehicle body from door dings and dents, said vehicle body side protector comprising:

a row of interconnected panels comprising a pair of opposite end panels and at least one middle panel interposed between said end panels;

each of said panels being pivotally coupled to the adjacent panels in said row of panels;

said panels each comprising a resilient material;

said panels each having a pair of generally straight and parallel sides, a first of said pair of sides of each panel being extended generally collinear with one another, a second of said pair of sides of each panel being extended generally collinear with one another;

said panels each having an arcuate transverse cross section taken substantially perpendicular to said sides of said panels such that each panel has a convex outer face and a concave inner face;

each of said end panels having a generally semi-circular rounded free end;

said row of panels being detachably mounted to a side of a vehicle such that said row of panels extends along over about three-fourth of the length of the side of the vehicle defined between front and back ends of the vehicle, said row of panels being extended over front and back wheel wells of the side of the vehicle;

said end panels each having a hinge assembly coupled to said inner face of the respective end panel for mounting said row of panels to a side of a vehicle;

each hinge assembly comprising an elongate mounting rail coupled to said inner face of the associated end panel and a hook bracket detachably attached to said mounting rail;

said mounting rail having a longitudinal axis extending between said sides of the associated end panel generally perpendicular to said sides of the associated end panel;

said mounting rail having a plurality of spaced apart threaded mounting holes arranged in a row extending along said longitudinal axis of said mounting rail;

said hook bracket having a generally rectangular bracket portion and a hook portion extending from said bracket portion;

said bracket portion having an bore extending therethrough;

said bracket portion being positioned adjacent said mounting rail such that said bore and one of said mounting holes of said mounting rail are generally coaxially aligned with one another and said hook portion upwardly and outwardly extends from said bracket portion;

a threaded fastener being extended through said bore of said mounting bracket and threadably inserted into said one mounting hole of said mounting rail to detachably attach said mounting bracket to said mounting rail;

said hook portions of each hinge assembly being extended into an associated space between a door of the vehicle and an adjacent portion of the body of the vehicle, said hook portion of each hinge assembly being hung on a door hinge located in the associated space of the vehicle such that said row of panels are mounted to the side of the vehicle with said inner faces of said panels facing inwards towards the vehicle and the outer faces of said panels facing outwards from the vehicle, said sides of said panels abutting the vehicle;

each of said panels having a generally cylindrical extent outwardly extending from said inner face of the respective panel, each of said extents having a terminal end opposite said inner face of the associated panel;

each of said extents having a magnet mounted to said terminal end of the respective extent, each magnet having an outer face generally lying in a common plane with said sides of the associated panel, said magnets being magnetically coupled to the side of the vehicle to magnetically mount said row of panels to the vehicle; and each of said magnets having a coating thereon adapted for reducing frictional contact between the magnet and the vehicle and so that the magnets do not scratch the side of the vehicle, wherein said coating comprises a polytetrafluoroethylene coating.

* * * * *